United States Patent Office 3,116,293
Patented Dec. 31, 1963

3,116,293
PHTHALOCYANINE-TRIAZINE DERIVATIVES
Mario Scalera and Frederick Brody, Somerville, N.J., assignors to American Cyanamid Company, New York, N.Y., a corporation of Maine
No Drawing. Filed May 15, 1958, Ser. No. 735,368
2 Claims. (Cl. 260—249)

This invention relates to sulfonated phthalocyanine triazine compounds having the formula:

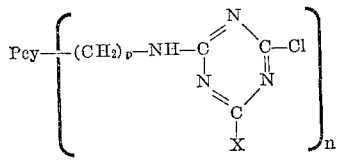

in which Pcy is a phthalocyanine ring, X is selected from the group consisting of chlorine and

R is selected from the group consisting of H and lower alkyl; Ar is a carbocyclic radical containing less than three azo groups; $n$ is a positive number $<4$ and $p$ is a number $>-1$ and $<2$; and compounds of the formula:

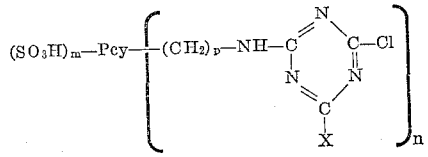

in which $m$ is a number from 0 to 4, inclusive, and the other symbols have the same significance as above.

The new compounds are useful as dyes for cellulosic fibers, the active chlorine on the triazine ring functioning as a reactive center to form a chemical bond with the fiber, or they may be used as intermediates for the formation of pigments.

The phthalocyanine radical may be metal free phthalocyanine or the various metal phthalocyanines such as copper, iron, cobalt, nickel and the like. The phthalocyanine radical may also be partially chlorinated.

Where X is chlorine, the color varies from blue to greenish-blue depending on whether the phthalocyanine radical has chlorine substituents. When X is a colored organic radical, the range of colors is very wide. For example, when X is a yellow colored radical, the resulting compound will be green to olive and other colored radicals will produce other colors, although the presence of the blue phthalocyanine normally precludes colors which are predominantly red or orange.

When $p$ is 1, the compounds of the present invention are prepared by reacting various aminomethyl phthalocyanines, sulfonated or unsulfonated, chlorinated or unchlorinated, with cyanuric chloride. In general, in order to produce reaction with only one chlorine atom on the cyanuric chloride, temperatures should be low, normally from 0° C. to 5° C. Any aminomethyl phthalocyanine may be used, a number of typical members being described in the patent to Lacey, No. 2,761,868, and especially in Examples 30 to 48 thereof.

When X contains a carbocyclic aromatic radical, there are two general methods by which the products can be prepared. Thus, in aqueous medium, it is possible to react the carbocyclic compound containing an amino group with one chlorine of cyanuric chloride at low temperatures as described above, and then react the amino or aminomethyl phthalocyanine with a second chlorine at higher temperatures of 35° C. to 70° C., and preferably about 40° C. to 60° C. Care should be taken not to exceed 80° C. as at these higher temperatures, the third chlorine of the cyanuric chloride becomes reactive.

Where both the reactants are water insoluble, as is the case in the formation of pigments, it is necessary to use organic diluents such as nitrobenzene. In such anhydrous media, the chlorine atoms are less reactive and higher temperatures may be used.

The reverse procedure may also be used, that is to say, the aminomethyl phthalocyanine may first be reacted with one chlorine of the cyanuric chloride at the low temperature and then the colored organic compound having a free primary amino group reacted with a second chlorine at temperatures of around 15° C. to 70° C., but below 80° C. Insofar as the new products of the present invention are concerned, it is not intended that they be limited to any particular method of preparation.

When $p$ is zero and X is chlorine, the compounds are prepared by reacting various aminophthalocyanines, which are usually produced by forming the phthalocyanine initially with nitrophthalic acid or nitrophthalonitrile. As described in the preceding paragraphs, the reaction with the first chlorine of the cyanuric chloride should be at low temperatures. It should be understood that it is very difficult to produce a single, pure aminophthalocyanine. Unless only nitrophthalic acid or nitrophthalonitrile is used, in which case there will be four amino groups after reduction, normally mixtures result having one or more amino groups. This does not constitute any problem, since it is not at all necessary that the products of the present invention be a single, perfectly defined chemical compound and mixtures are both useful and frequently obtained.

Where $p$ is zero and X contains a carbocyclic radical, the two types of processes described in conjunction with the aminomethyl phthalocyanine derivatives may be used. The same temperature conditions apply.

As pointed out above, it should be realized that the aminomethyl phthalocyanines which are used to produce the preferred compounds of the present invention are normally not a single, well defined chemical compound just as is the case with the aminophthalocyanines. Ordinarily, they are mixtures and are usually designated in terms of their average number of aminomethyl groups or sulfonic groups. This customary nomenclature is followed in the present specification. In general, there will be not more than about four aminomethyl substituents on the average and the sulfonic groups when present will range up to a little over three.

The nature of the carbocyclic radical, when present and linked to the triazine ring through the imino group, is very varied. Thus, for example, any azo dye which has a free primary amino or lower alkyl amino group may be reacted with a chlorine of the triazine ring to produce a compound containing a colored organic radical. Since the present invention is not directed to new azo dyes or to radicals of new azo dyes, typical representatives are those in which the diazo component is chosen from the following:

Aniline
o-Nitroaniline
m-Nitroaniline
p-Nitroaniline
o, m, and p-chloroaniline
2-nitro-4-chloroaniline
2-amino-5-nitrotoluene
4-amino-3-nitrotoluene
2-amino-4-nitrotoluene
2-amino-5-chlorotoluene
2-amino-4-chlorotoluene
2-amino-6-chlorotoluene
2,5-dichloroaniline 3,4-dichloroaniline
3-amino-4-chlorotoluene
O-anisidine
3-nitro-4-methoxy-aniline
4-nitro-2-methoxyaniline
2-nitro-4-ethoxyaniline
Dianisidine
1-amino-2,5-ethoxy-4-benzoylaminobenzene
4-amino-1-benzoyl-3,6-dimethoxybenzene
Benzidine (including monoacetyl derivatives)
Tolidine
4-chloro-2-methoxyaniline
1,5-dimethoxy-2-amino-4-chlorobenzene
1-methoxy-2-benzoylamino-4-chloro-5-aminobenzene
1-naphthylamine
1-aminoanthraquinone
1-amino-3-chloroanthraquinone
4-diethylsulfamido-2-amino-1-methoxybenzene
1-methoxy-2-aminobenzene-4-ethylsulfone
6-benzoylamino-4-amino-3-methyltoluene
4-methoxy-4'-aminodiphenylamine
4-aminodiphenylamine
4-chloro-2-aminodiphenyl ether
4,4'-dichloro-2-aminodiphenyl ether
o-Aminoazotoluene
2,6,4'-trimethyl-3'-nitro-4-aminoazobenzene
5-methyl-4-methoxy-2-amino-2'-chloro-4'-nitroazobenzene
4'-aminodiphenylamino-4-azotoluene
2-phenylazo-1-naphthylamine
2-aminodiphenylether-4-sulfonic acid
2-amino-2'-methyldiphenylether-4-sulfonic acid
4-aminoazobenzene
4-aminoazobenzene-4'-sulfonic acid
4-aminoazobenzene-3,4'-disulfonic acid
Orthanilic acid
1-methyl-4-amino-3-sulfonic acid
2-amino-5-chloro-4-toluene sulfonic acid
4-chloroaniline-2-sulfonic acid
Aniline-2,5-disulfonic acid
4-chloro-5-methyl-2-aniline sulfonic acid
3-amino-1-methoxybenzene-4-sulfonic acid
2,4-dimethylaniline-6-sulfonic acid
3-amino-1-trifluoromethylbenzene-4-sulfonic acid
3,4-dichloroaniline-6-sulfonic acid
3,5-dichloroaniline-6-sulfonic acid
3-methoxyaniline-6-sulfonic acid
4-methylaniline-6-sulfonic acid
Dehydrothiotoluidine sulfonic acid
2-aminonaphthalene-4,8-disulfonic acid
2-aminonaphthalene-6,8-disulfonic acid
2-aminonaphthalene-6-sulfonic acid
1-aminonaphthalene-4,5,6 and 8-sulfonic acid
2-aminonaphthalene-5,7-disulfonic acid
2-aminonaphthalene-7-sulfonic acid
p-Phenylenediamine
3,3'-dichlorobenzidine
3,3'-benzidine disulfonic acid
2,2'-dichloro-3,3'-dimethoxy-4,4'-diaminodiphenyl
2-aminopyridine
2-aminoquinoline The typical coupling components are as follows:
Aniline
o-Toluidine
m-Toluidine
2,5-dimethylaniline
o-Anisidine
m-Anisidine
3-amino-4-methoxytoluene
2,5-dimethoxyaniline
N-methylaniline
N-methyl-o-toluidine
N-methyl-m-toluidine
N-ethyl-o-toluidine
N-methyl-2-methoxy-5-methylaniline
N-ethyl-2-methoxy-5-methylaniline
N-methyl-m-anisidine
N-ethyl-m-anisidine
1-amino-8-naphthol-6-sulfonic acid
1-amino-8-naphthol-3,6-disulfonic acid
1-amino-8-naphthol-4,6-disulfonic acid
1-methylamino-8-naphthol-6-sulfonic acid
2-amino-5-naphthol-7-sulfonic acid
2-methylamino-5-naphthol-7-sulfonic acid
1-amino-8-naphthol-2,4-disulfonic acid
1-amino-8-naphthol-4-sulfonic acid
1-amino-8-naphthol-6-sulfonic acid
3-methyl-5-pyrazolone
1-phenyl-3-methyl-5-pyrazolone
1-(4-sulfophenyl)-3-methyl-5-pyrazolone
1-(4-chlorophenyl)-3-methyl-5-pyrazolone
1-phenyl-3-carbethoxy-5-pyrazolone
Acetoacetanilide
4-sulfo-acetoacetanilide
Bis-acetoacetbenzidide
Bis-acetoacettolidide
Acetoacettolidide
Beta-hydroxynaphthoic acid
Arylides of various naphthoic acids such as 2-hydroxynaphthanilide, 2-hydroxynaphthoyl toluidide and the like Another very important group of colored organic radicals are the aminoanthraquinones, typical examples of which are the following (AQ is used to designate an anthraquinone):

1-amino-4-(4'-aminophenylamino)-AQ-2,3'-disulfonic acid
1-methylamino-4-(4'-aminophenylamino)-AQ-2,3'-disulfonic acid
1-amino-4-(4'-aminophenylamino)-AQ-disulfonic acid
1-amino-4-(4'-aminophenylamino)-AQ-2,3',5'-trisulfonic acid
1-amino-4-(4'-[4''-aminophenylazo]-anilino)-AQ-2,5,2''-trisulfonic acid
1-amino-4-(4'-[4''-aminophenyl]-anilino)-AQ-2,5,3''-trisulfonic acid
1-amino-4-(4'-aminophenylamino)-AQ-3'-sulfonic acid
1-amino-4-(3'-aminophenylamino)-AQ-4'-sulfonic acid
1-amino-4-(4'-aminophenylamino)-AQ-2-sulfonic acid
1-amino-4-(3'-amino-4'-methylphenylamino)-AQ-2-sulfonic acid
1-amino-4-(4'-amino-3'-methylphenylamino)-AQ-2-sulfonic acid
1-amino-4-(3'-amino-4',6'-dimethylphenylamino)-AQ-2-sulfonic acid
1-amino-4-(4'-aminophenylamino)-AQ-3'-sulfonic acid diethylamide Another type of colored organic radical is an aminoazo anthraquinone radical, which of course may also be reacted with the chlorine of the cyanuric chloride.

While the compounds are, for the most part, useful as such, especially when there are sufficient solubilizing groups so that dye baths can be formed for the dyeing of cellulosic fibers, others are useful as intermediates for forming pigments or even for forming other dyes. Thus, for example, if a colored organic radical represented by X contains a primary amino group, this may then be diazotized and coupled to coupling components or, conversely, if the organic radical contains reactive hydrogen, it may be coupled with diazotized amines.

The invention will be described in greater detail in conjunction with the following specific examples in which the parts are by weight unless otherwise specified.

*Example 1*

A suspension of 8.4 g. (0.01 mol) of finely ground aminomethyl copper phthalocyanine (containing an average of three aminomethyl groups per molecule) is prepared in 4 liters of water containing a small amount of hydrochloric acid and a dispersing agent. This is then added to a suspension of 7.4 g. (0.04 mol) of cyanuric chloride in 1,000 parts of ice and water. The pH, which is initially acid, is adjusted to 4 to 5 with sodium carbonate and the mixture stirred at 0–5° C. until reaction is complete. The pH is then adjusted to 7–8 and the precipitate removed by filtration and dried. The product is a blue coloring matter.

*Example 2*

The product of Example 1 is added to a 1-liter solution of 0.04 mol of the aminoazo dye prepared by coupling diazotized amino-G acid (7-amino-1,3-naphthalenedisulfonic acid) with m-toluidine. The pH is adjusted to 7–8 by the addition of sodium carbonate and the mixture is stirred at 50–55° C. for about 3 hours and then allowed to cool to room temperature and to stir for about 12 hours. The solid product produced is removed by filtration, washed and dried. It is stable to treatment with dilute alkali or acid at the boil, and dyes cotton blue-green.

*Example 3*

The procedures of Examples 1 and 2 are repeated in the reverse order, that is to say, the aminoazo dye is first reacted with cyanuric chloride at 0–5° C. until the reaction is complete and the condensation of the resulting substituted dichlorotriazine with the aminomethyl phthalocyanine is carried out at a pH of 7 at 50–55° C. The product obtained is identical with that of Example 2.

*Example 4*

The procedure of Example 3 is followed except that the aminomethyl copper phthalocyanine used contains four aminomethyl groups per molecule. That is, 0.04 mol of cyanuric chloride is condensed first with 0.04 mol of the aminoazo dye, and the product then condensed with 0.01 mol of the phthalocyanine, using the same pH's and temperatures as above. The product is soluble in the reaction medium. The reaction mixture is basified with caustic and clarified, and the product precipitated by addition of 10% common salt by volume and washed with 10% brine. The product is a yellowish-green dye, stable in dilute caustic at the boil; a chromatogram on Sierra talc shows the product to be essentially homogeneous with only a trace of yellow impurity. It dyes cotton a yellow-green shade.

When the above procedure is repeated with a smaller proportion of the aminoazo dye as compared to the other reactants, a less yellowish shade of green is obtained. Thus, when the proportions of the aminomethyl copper phthalocyanine:cyanuric chloride:aminoazo dye are 0.01:0.014:0.014 mol, the product obtained is much greener and dyes cotton a neutral shade of green.

*Example 5*

To a suspension of 7.38 g. (0.04 mol) of cyanuric chloride in 750 ml. of water there is added 6.92 g. (0.04 mol) of sulfanilic acid. The temperature is maintained at 0–5° C. at a pH of 7–8 which is maintained by the addition of sodium carbonate. The mixture is agitated until condensation is complete whereupon it is acidified and the solid product which precipitates is removed by filtration.

The above product is then condensed with 8.4 g. (0.01 mol) of an aminomethyl copper phthalocyanine containing three aminomethyl groups per molecule in 5 liters of water, at pH 7–8, the temperature being maintained at 40–50° C. until reaction is complete. The product is soluble in the reaction medium; after acidification, it is salted out and dyes cotton a blue shade.

*Example 6*

To 4,000 parts of water there is added 0.14 mol sulfonated aminomethyl copper phthalocyanine containing an average of 2.7 sulfonic groups and 1.4 aminomethyl groups per molecule. The solution is cooled to 0–4° C. and the pH of the solution adjusted to about 7. To this solution at the same temperature there is then added 0.15 mol cyanuric chloride dissolved in a minimum amount of acetone. The pH is maintained between 6.0 and 6.5 by means of sodium carbonate. The addition is gradual as the pH becomes more acid during the reaction. When the pH no longer changes, the reaction mixture is maintained at the low temperature for an additional half hour and the pH then adjusted to 7.5 by the addition of sodium bicarbonate. A solid precipitates out and precipitation is increased by adding salt. After filtration at the low temperatures, a product is obtained which dyes cotton blue shades.

*Example 7*

Cyanuric chloride, 0.024 mol, is condensed with 0.024 mol of the aminoazo compound derived by coupling diazotized amino-G acid and m-toluidine. The condensation is performed in 5 liters of water at pH 7–8 at 0–5° C. After completion of the primary condensation there is added 0.024 mol of a copper phthalocyanine containing four aminomethyl groups and 1.2 sulfonic groups per molecule, in 3 liters of water, and the mixture is heated at 60° C. to completion of the secondary condensation. Precipitation of the product is completed by addition of 6% by volume of salt. It dyes cotton a yellowish green.

*Example 8*

The procedure of Example 7 is repeated but the aminoazo compound used is obtained by coupling diazotized O-tosyl-H acid to cresidine followed by alkaline hydrolysis of the O-tosyl group. The resulting product dyes cotton a violet shade.

*Example 9*

The procedure of Example 7 is repeated using corresponding amounts of the aminoazo compound from diazotized Cassella's acid coupled to cresidine. This product dyes cotton brown.

*Example 10*

The procedure of Example 7 is repeated using corresponding amounts of the aminoazo compound obtained by coupling diazotized p-aminoacetanilide to salicylic acid followed by a hydrolysis of the acetamido group. The product dyes cotton a bluish green.

*Example 11*

A 1% aqueous solution of primuline is stirred into an equimolecular amount (0.012 mol) of a suspension of 2.15 g. of cyanuric chloride in water. The temperature is maintained at 0–5° C. and the pH at 7 to 8. After reaction is complete, the condensation mixture is clarified and to it are added 83.5 g. of a paste containing 0.012 mol of sulfonated aminomethyl copper phthalocyanine having 3.3 aminomethyl groups and 1.4 sulfo groups per molecule. The mixture is stirred at 60° C. maintaining the pH at 5–6 for two hours, then at pH 8–9 for another hour. The product is precipitated by addition of 5% by volume salt. The product is stable to boiling dilute acid or alkali, and gives a homogeneous chromatogram on Sierra talc. It dyes cotton a bright bluish-green shade.

*Example 12*

The procedure of Example 11 is repeated with different amounts of the primary primuline cyanuric chloride condensate. Use of three molar equivalents of the condensate results in a product which dyes cotton a neutral shade of green, whereas 5 molar equivalents results in a product dyeing cotton a yellowish shade of green.

*Example 13*

The procedure of Example 11 is repeated replacing the copper phthalocyanine with two molar equivalents of a cobalt phthalocyanine having 1.7 aminomethyl groups and 1.2 sulfonic groups per molecule. The product dyes cotton a neutral green shade.

Example 14

18.5 g. of 4,4′-diaminostilbene-2,2′-disulfonic acid is tetrazotized and coupled with an equimolar quantity of salicylic acid dissolved in soda ash, the salicylic acid being gradually added to the tetrazo slurry at room temperature. After coupling is complete, the product is acidified to a pH of 5 and then coupled to aniline omega salt prepared from 5.12 g. of aniline, 1.65 g. of formaldehyde and 5.32 g. of sodium metabisulfite. The second coupling is effected at room temperature at pH 5 with agitation for about 12 hours. The slurry is then made strongly alkaline and heated to 80° C. to hydrolyze the omega salt. Thereupon, the product is salted out and purified by reprecipitation from aqueous caustic soda solution by resalting.

13 g. of the above product, containing 0.0075 mol of disazo dye, is condensed with an equimolecular quantity of cyanuric chloride in 600 parts of water at 0–5° C., the pH being maintained at 7–8.

An aliquot of the above solution is reacted in water with an equimolecular amount of a sulfonated aminomethyl copper phthalocyanine (containing 3.3 aminomethyl and 1.4 sulfonic groups per molecule). The pH is adjusted to 7–8 and heating continued until reaction is complete. The solid precipitate which forms is removed by filtration and dyes cotton an olive green shade.

Example 15

The procedure of Example 1 is repeated replacing the aminomethyl copper phthalocyanine with an equivalent amount of amino copper phthalocyanine having an average of three amino groups per molecule. A blue product is obtained which is an intermediate for the production of pigments.

Example 16

The product of Example 15 is reacted at 60° C. with an equimolecular quantity (based on the triazine) of the aminoazo dye obtained by coupling diazotized amino-G acid and m-toluidine. The product dyes cotton a yellowish green shade.

Example 17

The product of Example 6 is further reacted with an equimolar solution of H acid (8-amino-1-naphthol-3,6-disulfonic acid) in water at 40–50° C. with addition of sodium carbonate to maintain the pH at 8–9. Upon completion of the reaction, the mixture is cooled below 10° C. in an ice bath and a diazo suspension, prepared by diazotizing an equimolar quantity of 4-methyl-5-chloro-orthanilic acid, is added. The pH is then raised to 8–9 by addition of insufficient caustic with stirring followed by sodium carbonate, whereupon coupling commences and is allowed to proceed to completion at 0–10° C. The reaction product is isolated by salting and dyes cotton violet.

Example 18

The procedure of Example 17 is repeated replacing the diazo compound with equimolecular quantities of the diazo compounds derived from aniline, o-aminobenzoic acid and sulfanilic acid. These products dye cotton bluish shades of violet.

Example 19

The procedure of Example 18 is repeated using corresponding quantities of diazos from o-anisidine, 2,5-dimethoxyaniline and 2-methoxyaniline-4-sulfonic acid. These products dye cotton reddish shades of blue.

Example 20

Cyanuric chloride is condensed with an equimolar quantity of J acid (6-amino-1-naphthol-3-sulfonic acid) in water at pH 6–7 and 0–10° C. To the reaction mixture is added an equimolar quantity of a copper phthalocyanine having 2.7 sulfonic and 1.4 aminomethyl groups per molecule, and the whole heated at 50–55° C. and pH 8–9 until the secondary condensation is complete. The reaction mixture is cooled to 5° C., a solution of aniline diazo is added, and the pH raised to 8–9, whereupon coupling commences. Upon completion of the reaction, carried out below 10° C., the product is isolated by salting. It dyes cotton a bluish violet shade.

Example 21

The procedure of Example 20 is repeated using corresponding amounts of the diazos from 2-anisidine-4-sulfonic acid, naphthionic acid and aminoazobenzene-4′-sulfonic acid. These products dye cotton bluish violet shades.

Example 22

An equimolar mixture of 1.8 g. of cyanuric chloride and 1.9 g. of 2,5-diaminobenzenesulfonic acid in water is stirred at 0–5° C. while maintaining the pH at 5–7 by additions of sodium carbonate. When the primary condensation is complete, there is added one molar equivalent of a copper phthalocyanine having 3.3 aminomethyl and 1.4 sulfonic groups per molecule. The pH is raised to 8–9 and maintained there while stirring at 50–55° C. until the secondary condensation is complete. The product is isolated by filtration and washed with dilute brine.

A suspension of the above product in dilute acid is diazotized at 10–20° C. and the diazo coupled with an equivalent of G salt (2-naphthol-6,8-disulfonic acid) at pH 9 and room temperature. The product is isolated by salting and dyes cotton a reddish shade of blue.

Example 23

The procedure of Example 22 is repeated replacing the G salt coupling component with equivalent amounts of 1-(4-sulfophenyl)-3-methyl-5-pyrazolone. A product is obtained which dyes cotton a bluish shade of green.

Example 24

The procedure of Example 23 is repeated, but equivalent amounts of salicylic acid and of acetoacetanilide were used. The products also are blue-green colors but show much lower solubility than do those of Example 23.

Example 25

A primary condensation product is prepared from equimolar amounts of cyanuric chloride and 4-(4′-aminoanilino)-1-aminoanthraquinone-2,2′-disulfonic acid by reaction in water at 0–10° C. and pH 6–7. This is further reacted with an equimolar amount of a copper phthalocyanine having 2.7 sulfonic and 1.4 aminomethyl groups at 50–55° C. and pH 8–9. The product is isolated by salting and filtration and dyes cotton blue.

Example 26

The procedure of Example 25 is repeated using corresponding quantities of the following compounds: 4-(4′-aminoanilino)-1-ethylamino anthraquinone-5,2′-disulfonic acid and 4-(4′-aminoanilino)-N-methyl-1,9-anthrapyridone-2,2′-disulfonic acid. These compounds also dye cotton various shades of blue, similar to but not quite identical with that of the product of Example 25.

Example 27

A slurry of 1.85 g. of finely divided cyanuric chloride in 250 ml. water at 0–5° C. is treated with a solution containing 5.83 g. of 1-amino-4-(4′-methylaminoanilino)-anthraquinone-2,5,3′-trisulfonic acid in 250 ml. water and the mixture is stirred at 0–5° C. and pH 6–7. When reaction is complete, there is added 500 ml. water containing an equimolar amount of a copper phthalocyanine having 2.7 sulfonic and 1.4 aminomethyl groups per molecule, and the mixture is heated at 50–55° C. and pH 8–9 until the second condensation is complete. The product is isolated by salting, and dyes cotton blue.

Example 28

Into a dye bath containing 100 mg. of the product of Example 7 obtained from amino G diazo and m-toluidine, in 150 cc. water at 100° F. is entered a 5 g. piece of 80 x 80 cotton. The bath is raised to the boil and boiling is continued for twenty minutes. Fifty milligrams of common salt are then added and the bath is further boiled for twenty minutes. The addition of 50 mg. of salt and the boiling are repeated for a final twenty minutes. The piece of cotton is removed and rinsed. It is dyed a bright yellow shade of green of moderate wash fastness.

Example 29

Padding procedure with curing by pad-steam method using the product of Example 7:

A dye solution is prepared by dissolving 2 grams of the dye of Example 7 in 100 grams of water containing 0.3 gram of surface active agent, polyoxyethylene esters of mixed fatty and resin acids sold as Renex 20. A piece of cotton fabric is padded in this solution at about 160–175° F. and is then removed and passed through rollers adjusted to allow an 80% pick-up. The cloth is then dried.

The piece of dried fabric is then padded in 100 ml. of a chemical pad bath containing 30 grams of sodium chloride and 5 ml. of 30° Bé. sodium hydroxide solution. It is removed and passed through rollers adjusted to allow about a 50% pick-up. The temperature of this pad bath should be at about room temperature, about 68° F. The fabric is then steamed for about one minute at 235° C.

Non-bonded dye is then removed from the fabric by soaping at the boil. This involves heating at the boiling point in a solution containing about 2 grams per liter of an oleate soap. The dyeing is a yellow-green shade of excellent wash fastness.

Example 30

Through a pad bath at 85° F. containing 1 g. of the dye of Example 6 in 50 ml. water is passed a two-foot length of 7-inch 80 x 80 cotton, which is then passed through a mangle set to give 80% pick-up of the pad bath liquor. The padded cotton is dried at 160° F. in hot air. It is then passed through a bath containing 30 g. salt and 2 g. caustic soda per 100 ml., at 85° F. and 80% pick-up, and steamed for one minute at 235° F. The dyeing is then soaped, and is a bright blue shade, of excellent fastness to washing, and good light fastness.

We claim:

1. A compound of the formula:

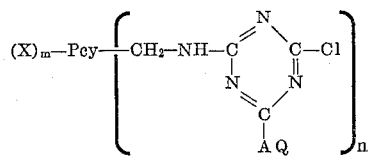

in which Pcy is phthalocyanine, X is a member selected from the group consisting of Cl and $SO_3M$, $m$ is a positive number from 1 to 4, inclusive, $n$ is a position number $<4$, AQ is an N-aminoanthraquinone radical and M is a cation selected from the group consisting of hydrogen and the alkali-metals.

2. A compound of the formula:

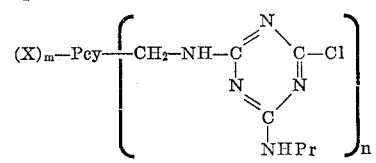

in which Pcy is phthalocyanine, X is a member selected from the group consisting of Cl and $SO_3M$, $m$ is a positive number from 1 to 4, inclusive, $n$ is a positive number $<4$, Pr is the residue of primuline and M is a cation selected from the group consisting of hydrogen and the alkali-metals.

References Cited in the file of this patent

UNITED STATES PATENTS

| | | |
|---|---|---|
| 2,403,502 | Haddock et al. | Nov. 4, 1947 |
| 2,479,491 | Haddock et al. | Aug. 16, 1949 |
| 2,761,868 | Lacey | Sept. 4, 1956 |

FOREIGN PATENTS

| | | |
|---|---|---|
| 2630 of 1957 | South Africa | Aug. 13, 1957 |

OTHER REFERENCES

Bergmann: The Chemistry of Acetylene and Related Compounds, page 80, Interscience Publishers, Inc. N.Y. (1948).

UNITED STATES PATENT OFFICE
CERTIFICATE OF CORRECTION

Patent No. 3,116,293                 December 31, 1963

Mario Scalera et al.

It is hereby certified that error appears in the above numbered patent requiring correction and that the said Letters Patent should read as corrected below.

Column 10, line 13, for "position" read -- positive --.

Signed and sealed this 9th day of June 1964.

(SEAL)
Attest:

ERNEST W. SWIDER                 EDWARD J. BRENNER
Attesting Officer                   Commissioner of Patents